(12) United States Patent
Lee et al.

(10) Patent No.: US 7,981,329 B2
(45) Date of Patent: Jul. 19, 2011

(54) METHOD OF MANUFACTURING OPTICAL COMPONENTS

(75) Inventors: Chih-Chun Lee, Taipei (TW); Sheng-Yi Hsiao, Changhua County (TW); Weileun Fang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 12/357,039

(22) Filed: Jan. 21, 2009

(65) Prior Publication Data
US 2009/0194892 A1 Aug. 6, 2009

(30) Foreign Application Priority Data
Feb. 1, 2008 (TW) ................................ 97104075 A

(51) Int. Cl.
*B29D 11/00* (2006.01)
*B29C 39/00* (2006.01)
*G02B 1/00* (2006.01)

(52) U.S. Cl. ..................... 264/1.38; 264/1.32; 264/1.36; 264/298; 523/108

(58) Field of Classification Search .................. 264/1.1, 264/1.32, 1.36, 1.38, 298; 523/106–108
See application file for complete search history.

(56) References Cited

U.S. PATENT DOCUMENTS

| | | | |
|---|---|---|---|
| 4,838,665 A * | 6/1989 | Hasegawa et al. ............. 359/665 |
| 5,625,496 A * | 4/1997 | Akiyama et al. ............... 359/666 |
| 6,009,728 A * | 1/2000 | Kashiwagi et al. ......... 65/374.11 |
| 7,249,941 B2 * | 7/2007 | Karasawa .................... 425/174.4 |
| 7,731,873 B2 * | 6/2010 | Darnton et al. ................ 264/1.38 |
| 7,845,615 B2 * | 12/2010 | Hagmann et al. .............. 249/134 |
| 7,850,878 B2 * | 12/2010 | Lawton et al. ................ 264/1.32 |
| 2005/0140922 A1 * | 6/2005 | Bekerman et al. ................ 351/41 |
| 2006/0093704 A1 * | 5/2006 | Naito et al. ..................... 425/572 |
| 2007/0037897 A1 * | 2/2007 | Wang et al. ..................... 523/106 |
| 2007/0123602 A1 * | 5/2007 | Linhardt et al. ............... 523/106 |
| 2007/0222095 A1 * | 9/2007 | Zanini et al. .................. 264/1.32 |
| 2008/0073804 A1 * | 3/2008 | Matsuzawa et al. ............ 264/2.6 |
| 2008/0174035 A1 * | 7/2008 | Winterton ...................... 264/1.36 |
| 2009/0127726 A1 * | 5/2009 | Spalding et al. ............... 264/1.7 |
| 2010/0276824 A1 * | 11/2010 | Pruitt et al. .................... 264/1.36 |
| 2010/0289163 A1 * | 11/2010 | Yoshida .......................... 264/2.5 |

FOREIGN PATENT DOCUMENTS

| | | | | | |
|---|---|---|---|---|---|
| JP | 363205220 A | * | 8/1988 | | |
| JP | 363205220 A1 | * | 8/1988 | ..................... 264/1.1 |

* cited by examiner

*Primary Examiner* — Kat Wyrozebski
*Assistant Examiner* — Nahida Sultana
(74) *Attorney, Agent, or Firm* — Volpe and Koenig, P.C.

(57) ABSTRACT

A method of manufacturing an optical component is provided. The method comprises steps of providing a first liquid; providing a fluid, disposed above the first liquid, wherein an interface exists between the first liquid and the fluid; providing a polymer precursor at the interface; and solidifying the polymer precursor so as to form the optical component made by a polymer.

17 Claims, 5 Drawing Sheets

METHOD OF MANUFACTURING OPTICAL COMPONENTS

FIELD OF THE INVENTION

The present invention relates to a method of manufacturing optical components, and more particularly to a method of manufacturing optical components of polymers.

BACKGROUND OF THE INVENTION

Presently the optical components, such as lenses, could be classified into two categories in general, which are glass lenses and plastic lenses. In comparison, glass lenses can endure high temperature and slightly higher transmittance than plastic lenses, but glass lenses are much more fragile and their manufacturing hours are ten times longer than that of plastic ones because of several grind processes usually used in manufacture, and thus the production costs are much higher.

Plastic lenses have advantages of fast manufacture and cheap cost for mass production. However, plastic lenses usually use some manufacturing techniques such as injection molding or die casting to produce, and all these need precise molds, yet a set of precise molds always cost hundreds of thousands of dollars. For the precise mold of non-spherical lenses, the price is even higher. Besides, the manufacture for precise molds always takes one month or longer to finish, and therefore plastic lenses are suitable for the market of mass demand in order to recover the cost of precise molds.

Hence, in order to solve the problems of the expensive price and the long production time of precise molds, to utilize the resources on the Earth economically, to make plastic lenses suitable for production types of mass quantity but few varieties as well as great varieties but less quantity simultaneously, and to further shorten the lead time of production, the present invention provides a novel concept and solution to solve the abovementioned issues effectively and to lower the production cost substantially.

SUMMARY OF THE INVENTION

In accordance with one aspect of the present invention, a method of manufacturing an optical component is provided. The method comprises steps of providing a first liquid; providing a fluid, disposed above the first liquid, wherein an interface exists between the first liquid and the fluid; providing a polymer precursor at the interface; and solidifying the polymer precursor so as to form the optical component made by a polymer.

Preferably, the first liquid is a glycerin.

Preferably, the step of providing the polymer precursor at the surface is performed by using one of a manual syringe and an electric dispenser.

Preferably, the fluid is one of a second liquid and a gas.

Preferably, the second liquid is a silicon oil.

Preferably, the polymer precursor has a density smaller than that of the first liquid, but greater than that of the fluid.

Preferably, the polymer is one of a thermosetting polymer and a thermoplastic polymer.

Preferably, when the polymer is the thermosetting polymer, the step of solidifying the polymer precursor comprises at least one selected from a group consisting of photocuring, thermocuring or dual-part curing.

Preferably, the method further comprises a step of providing a frame in the liquid for at least one of positioning the polymer precursor and adjusting a shape of the polymer precursor.

Preferably, the optical component has a surface roughness smaller than 10 mm.

In accordance with another aspect of the present invention, a method of manufacturing an optical component is provided. The method comprises steps of providing a fluid; providing a substrate disposed in the fluid; providing a polymer precursor on the substrate; and solidifying the polymer precursor so as to form the optical component made by a polymer.

Preferably, the fluid is one of a liquid and a gas.

Preferably, the substrate is a glass.

Preferably, the step of providing a polymer precursor into the liquid is performed by using a manual syringe and an electric dispenser.

Preferably, the polymer precursor has a density greater than that of the fluid.

Preferably, the polymer is one of a thermosetting polymer and a thermoplastic polymer.

Preferably, when the polymer is the thermosetting polymer, the step of solidifying the polymer precursor comprises at least one selected from a group consisting of photocuring, thermocuring or dual-part curing.

Preferably, the optical component has a surface roughness smaller than 10 nm or has a radius ranged from 0.35 mm to 2 mm.

In accordance with a further aspect of the present invention, a method of manufacturing an optical component is provided. The method comprises steps of providing a liquid; providing a polymer precursor into the liquid; and solidifying the polymer precursor so as to form the optical component made by a polymer.

Preferably, the liquid is a glycerin.

Preferably, the step of providing the polymer precursor into the liquid is performed by using one of a manual syringe and an electric dispenser.

Preferably, the polymer is one of a thermosetting polymer and a thermoplastic polymer.

Preferably, when the polymer is the thermosetting polymer, the step of solidifying the polymer precursor comprises at least one selected from a group consisting of photocuring, thermocuring and dual-part curing.

Preferably, the polymer precursor has a density close to that of the liquid.

Preferably, the method further comprises a step of providing a frame in the liquid for at least one of positioning the polymer precursor and adjusting a shape of the polymer precursor.

Preferably, the optical component has a surface roughness smaller than 10 nm or has a diameter ranged from 200 μm to 600 μm.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 1A:
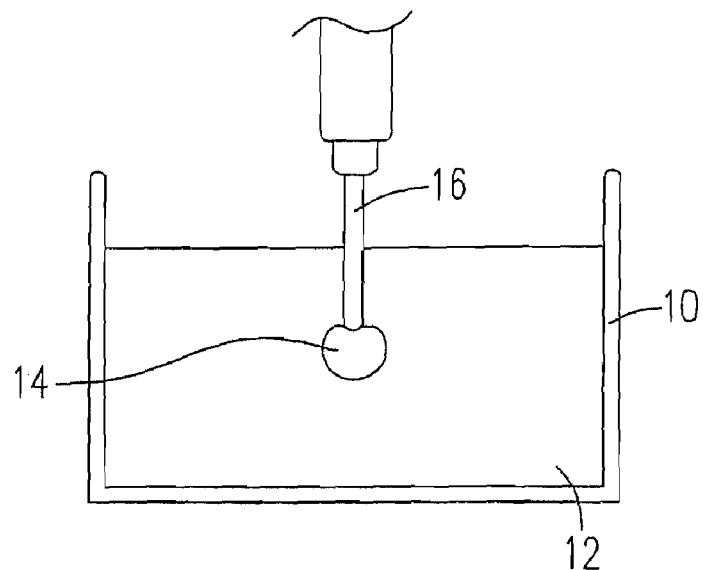
FIGS. 1A-1B show the optical component production processes according to the first embodiment of the present invention.
Figure 1B:
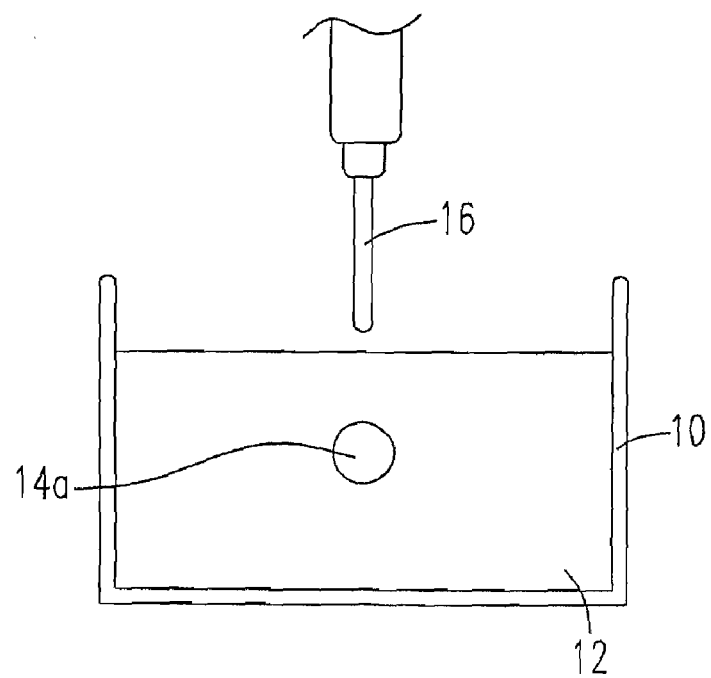

FIGS. 1A-1B show the optical component production processes according to the first embodiment of the present invention. Please refer to FIG. 1A. Firstly, the liquid 12 is filled into the container 10 (e.g. glycerin, silicon oil, salt solution, sugar solution, etc., or any fluid whose characteristics like specific gravity or surface tension can be adjusted). Then, the injector 16 of the electric dispenser (the hand-pushed syringe can be used instead) is put into the liquid 12. Next, a polymer precursor 14 is dispensed from the injector 16 into the liquid 12 (otherwise, the injector 16 can be put above the surface of the liquid 12 and dispense the polymer precursor thereinto). Please refer to FIG. 1B. Subsequently, the injector 16 is removed and the polymer precursor 14 in the liquid 12 is solidified so as to form an optical component 14a constituted by polymer. Because the pressure from every direction to a point in the liquid is equivalent, the optical component 14a will become spherical, and the size of which is determined by the amount of the injected polymer precursor 14.

As to the method of solidifying, it is possible to use the photocurable process, for example use the UV light to solidify because of the rapid solidifying velocity and the short solidifying time, or use the thermocurable process or the dual-form curable process which possesses faster reacting velocity.

It is likely to choose the liquid whose density (i.e. the specific gravity) is equivalent to that of the polymer precursor 14, and which does not generate chemical reaction with or dissolve with the polymer precursor 14, as the liquid 12. Therefore the polymer precursor 14 will float within the liquid 12 instead of precipitating in or drifting on the liquid 12.

The method of manufacturing the optical component in this embodiment has the advantages of fast production velocity, no mold requirement, and adjusting the size of the optical component freely and rapidly according to the demand without changing multiple sets of molds. Since the cost of plastic material is low but that of molds is high, and the manufacturing time of molds is long, the method of manufacturing the optical component in this embodiment can lower the production cost and shorten the lead time of production substantially, and achieve a special efficacy of almost real-time production.

Second Embodiment

Figure 2A:
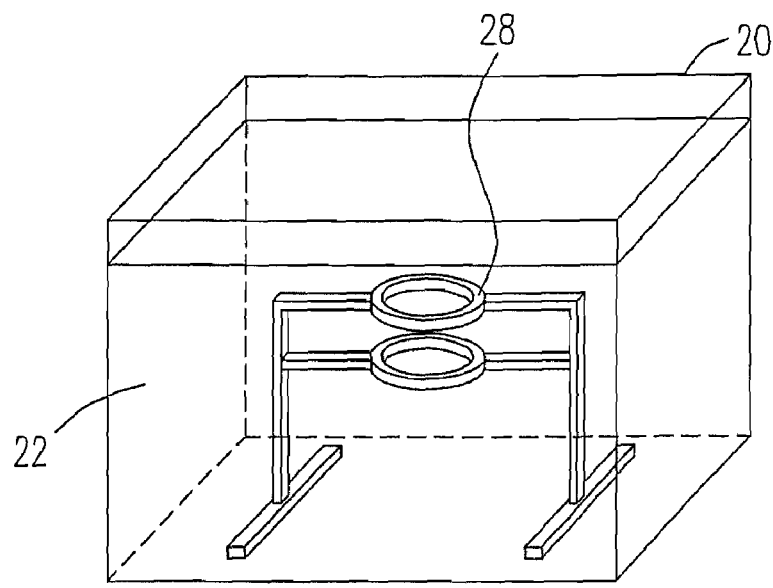
FIGS. 2A-2C show the optical component production processes according to the second embodiment of the present invention.
Figure 2B:
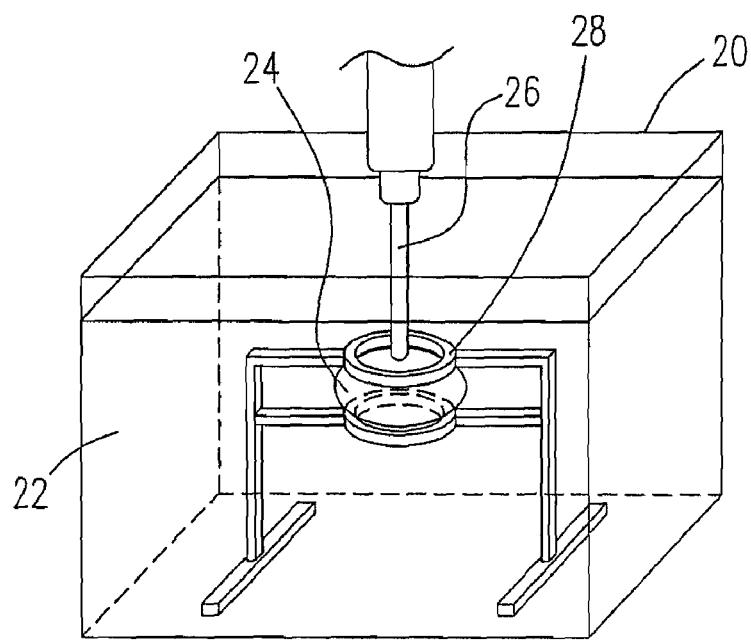
Figure 2C:
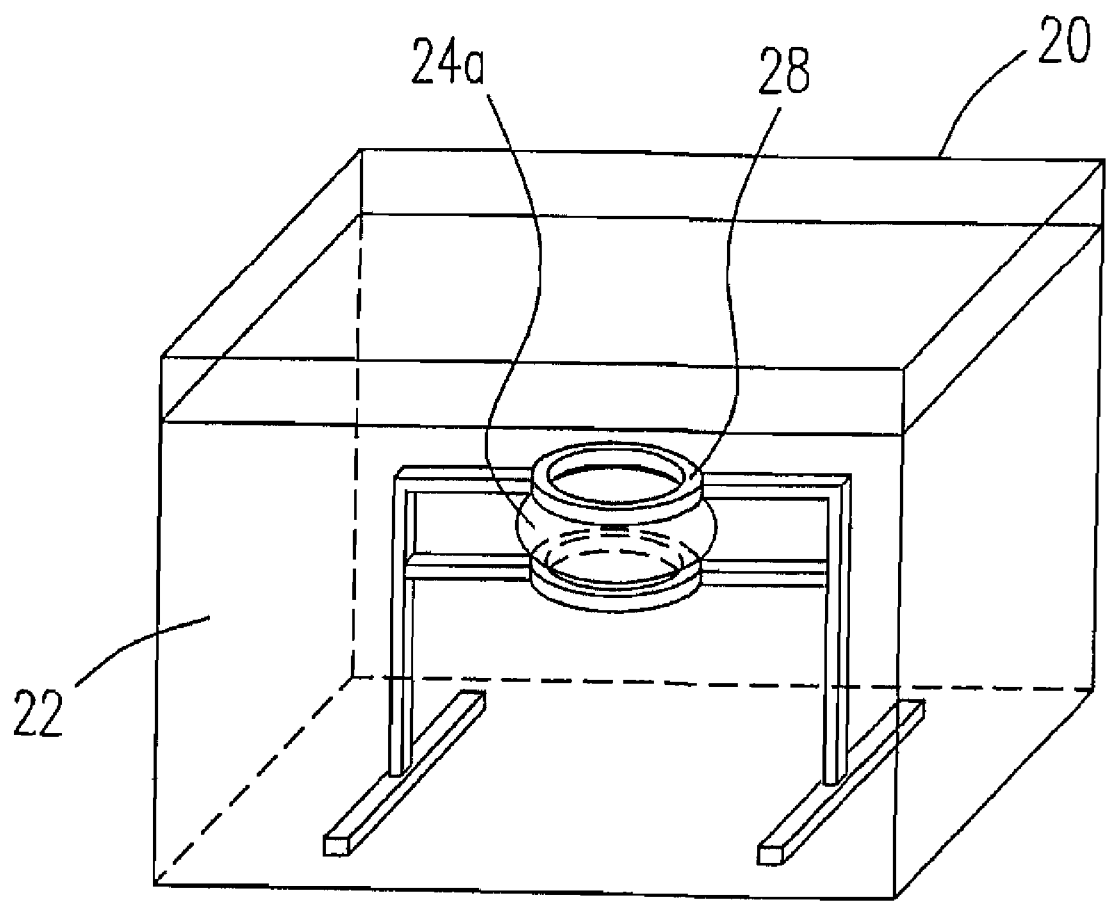

FIGS. 2A-2C show the optical component production processes according to the second embodiment of the present invention. Please refer to FIG. 2A. Firstly, a frame 28 is set in the container 20 and a liquid 22 (e.g. glycerin) is poured thereinto. The frame 28 may include two circle frames on the upside and downside, as shown in FIG. 2A. Please refer to FIG. 2B. Next, the injector 26 of the electric dispenser insert liquid 22 is put at the location between the upside circle frame and the downside circle frame, and the polymer precursor 24 is dispensed from the injector 26 into the liquid 22. When the amount of the injected polymer precursor 24 is great enough to contact the two circle frames, the polymer precursor 24 will be oval-shaped, as shown in FIG. 2B, because of the compression of the circle frames. Please refer to FIG. 2C. Then, the injector 26 is removed and the polymer precursor 24 in the liquid 22 is solidified so as to form an optical component 24a constituted by polymer, wherein the shape of the optical component 24a is oval.

Therefore, by adjusting the respective diameters of the upside and the downside circle frames of the frame 28 as well as the distance therebetween, and the amount of the injected polymer precursor 24, the oval-shaped bodies with different volumes, sizes, and cambers can be manufactured, thereby defining the optical components with different optical parameters like the focal length or else. Furthermore, the respective diameters of the upside circle frame and the downside circle frame can be different. When the two diameters are different, the respective cambers on the upside and downside of the optical component manufactured will be different. This diversifies the optical design possess.

On the other hand, if the polymer precursor 24 does not contact the upside circle frame and the downside circle frame simultaneously, i.e. not compressed by the two frames, it is spherical. Adjusting the relative sizes of the circle frames and the polymer precursor 24 appropriately can confine the polymer precursor 24 in the two circle frames without floating away. At this moment, the circle frames have the function of alignment to prevent two polymer precursor 24 spheres from colliding and transforming before solidifying. Alternatively, the frames are not necessary to be round-shaped; they can be triangles, squares, hexagons or octagons.

When putting into mass production in practice, arrays of injectors are available, e.g. 8×8 arrays, 64 injectors 26 totally; frames 28 can also use 8×8 arrays, 64 sets of the upside circle frame and downside circle frame totally. In this case, 64 optical components 24a can be produced simultaneously in one production cycle, which is a huge elevation of production efficiency. Certainly, the amount of units in the arrays can be increased or decreased properly based on the practical demand. In addition, the amount of the polymer precursor 24 dispensed from each syringe in the arrays as well as the respective diameters of the upside circle frame and the downside circle frame and the distance therebetween can be different, so that the production for optical components 24a in one lot can be distinguishable in size and shape, making the production more elastic and convenient.

Third Embodiment

Figure 3A:
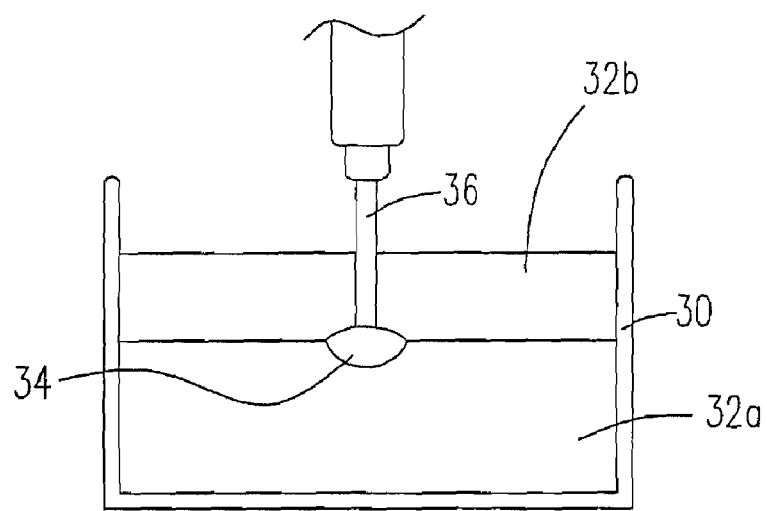
FIGS. 3A-3B show the optical component production processes according to the third embodiment of the present invention.
Figure 3B:
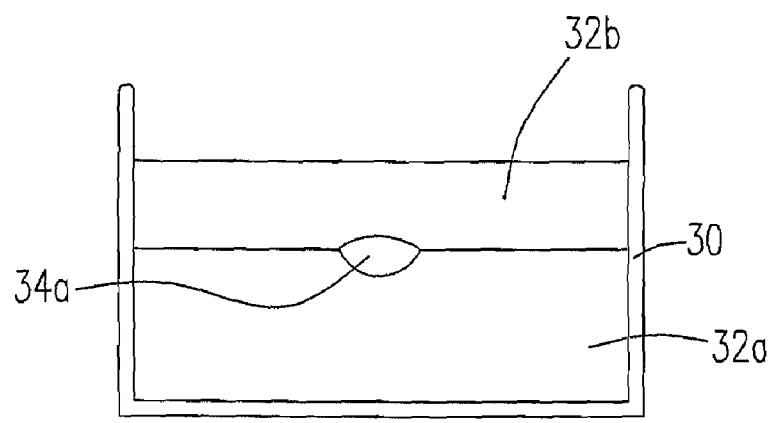

FIGS. 3A-3B show the optical component production processes according to the third embodiment of the present invention. Please refer to FIG. 3A. Firstly, the first liquid 32a is filled into the container 30 (e.g. glycerin, silicon oil, salt solution, sugar solution, etc., or any fluid whose characteristics like specific gravity or surface tension can be adjusted). Next, a fluid 32b is filled into the container 30. The fluid 32b can be a second liquid (e.g. silicon oil, vegetable oil, mineral oil or any other liquid which is not oil and whose specific gravity is lighter than that of the first liquid 32a). Since the first liquid 32a and the fluid 32b will not dissolve with each other, an interface will be formed between the first liquid 32a, such as glycerin, and the fluid 32b, such as silicon oil. Subsequently, the injector 36 of the electric dispenser (the hand-pushed syringe could be used instead) is put into the interface between the first liquid 32a and the fluid 32b, and the polymer precursor 34 is dispensed from the injector 36 into the interface. The injector 36 is not necessary to be put into the location of the interface. Since the specific gravity of the polymer precursor 34 is between those of the two liquids, the polymer precursor 34 will sink or float to the location of the interface eventually. Please refer to FIG. 3B. Then, the injector 36 is removed and the polymer precursor 34 located on the interface is solidified so as to form an optical component 34a constituted by polymer.

The liquid which does not generate chemical reaction with or dissolve with the polymer precursor 14 can be chosen as the first liquid 32a and the fluid 32b. When the density of the first liquid 32a is greater than that of the polymer precursor 34, and the density of the polymer precursor 34 is greater than that of the fluid 32b, the polymer precursor 34 will suspend in the interface between the first liquid 32a and the fluid 32b.

In this embodiment, it is possible to change the hydraulic pressure from the upside layer and the downside layer to the polymer precursor 34 on the interface by adjusting the respective densities of the first liquid 32a, the fluid 32b and the polymer precursor 32, so as to adjust the cambers on the upside and the downside of the manufactured optical component 34a.

On the other hand, the surface tension of the first liquid 32a, the fluid 32b and the polymer precursor 34 will also affect the variation of the camber, so it is possible to add some additives like the leveling agent or else in the polymer precursor 34 to adjust the surface tension thereof, or add some dissolvable additives in the first liquid 32a and/or the fluid 32b to adjust the surface tension thereof.

In this embodiment, all methods in the first embodiment can be used in the solidifying method for the polymer precursor 34, which will not be described repeatedly.

Additionally, the fluid 32b in this embodiment can be other fluids as well, e.g. gas. In this case, the polymer precursor 34 will float on the first liquid 32a. By adjusting the respective densities of the first liquid 32a and the polymer precursor 34 as well as the air pressure of the fluid 32b, the cambers on the upside and downside of the manufactured optical component 34a can be adjusted.

On the other hand, it is possible to combine the method of this embodiment with that of the second embodiment, i.e. disposing two circle frames on the upside and the downside of the interface between the first liquid 32a and the fluid 32b respectively, so as to further define and design the cambers on the upside and the downside of the polymer precursor 34.

Fourth Embodiment

Figure 4A:
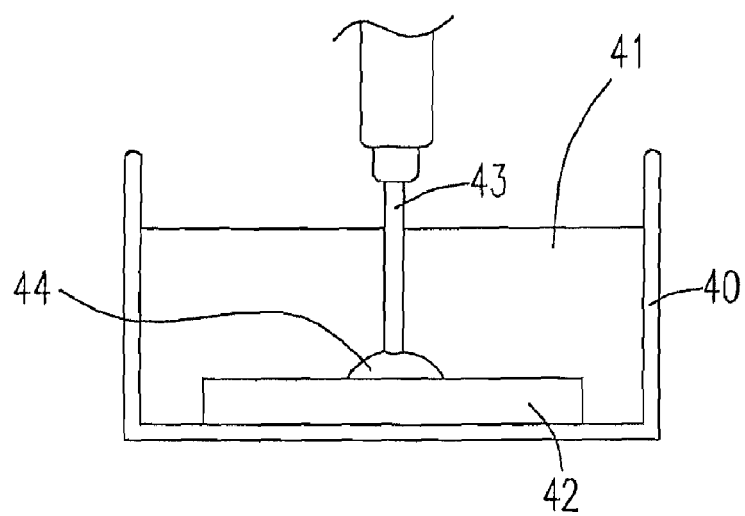
FIGS. 4A-4B show the optical component production processes according to the fourth embodiment of the present invention.
Figure 4B:
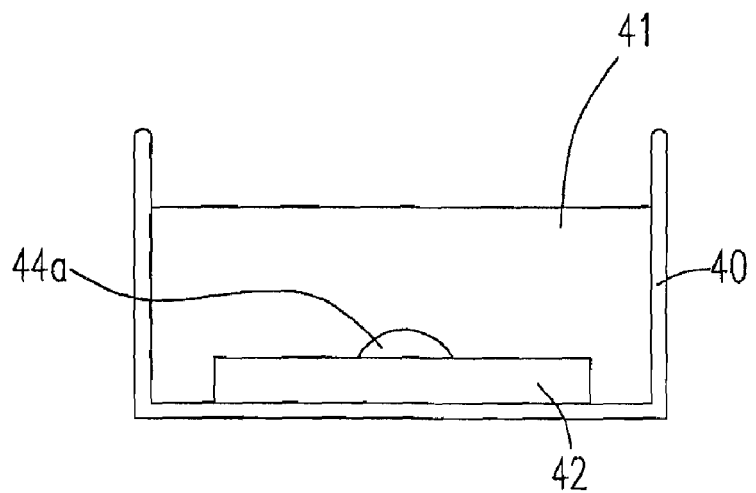

FIGS. 4A-4B show the optical component production processes according to the fourth embodiment of the present invention. Please refer to FIG. 4A. Firstly, a liquid 41 is filled into the container 40 (e.g. glycerin, silicon oil, salt solution, sugar solution, etc., or any fluid whose characteristics like specific gravity or surface tension can be adjusted). Next, a substrate 42 is disposed in the liquid 41, and a polymer precursor 44 is dispensed from the injector 43 of the electric dispenser (the hand-pushed syringe could be used instead) onto the substrate 42. Please refer to FIG. 4B. Then, the injector 43 is removed and the polymer precursor 44 on the substrate 42 is solidified so as to form an optical component 44a constituted by polymer.

The liquid which does not generate chemical reaction with or dissolve with the polymer precursor 44, and whose density is smaller than that of the polymer precursor 44, can be chosen as the liquid 41. Since the density of the polymer precursor 44 is greater than that of the liquid 41, the polymer precursor 44 will maintain its position on the substrate 42 without floating in the liquid 41. Instead of choosing a liquid in this embodiment, other fluids will also be available, such as gas. Besides, the material of the substrate 42 could be glass or anything pervious to light, depending on what is suitable for integration with MEMS devices or other applications using the optical component 44a comprising the substrate 42.

In this embodiment, it is possible to change hydraulic pressure for the polymer precursor 44 by adjusting the respective densities of the liquid 41 and the polymer precursor 44 so as to adjust the camber of the manufactured plano-convex optical component 44a. Alternatively, the method described in the previous embodiment where additives are added in the liquid 41 or the polymer precursor 44 to adjust the surface tension can be used as well. In addition, the solidifying methods for the polymer precursor 14 in the first embodiment can also be used in this embodiment.

For the optical components manufactured with the method of the present invention, the surface roughness thereof is smaller than 10 nm. Besides, the diameter of the manufactured ball lens is ranged from 200 μm to 600 μm, and the radius of the plano-convex lens is ranged from 0.35 mm to 2 mm.

In conclusion, the present invention provides a method of manufacturing optical components without the requirement of the expensive and complicated precise mold. This makes the plastic lens and the plastic optical component suitable for the production type of mass quantity but few varieties or great varieties but less quantity simultaneously, and further shortens the lead time of production, thereby substantially elevating the production capability and enormously lowering the production cost.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of manufacturing an optical component, comprising steps of:
   providing a first liquid;
   providing a second liquid, disposed above the first liquid, wherein an interface exists between the first liquid and the second liquid;
   providing a frame set including a first frame and a second frame;
   disposing the frame set around the interface so that the first frame is disposed in the first liquid and the second frame is disposed in the second liquid;
   disposing a polymer precursor at the interface and between the first frame and the second frame; and
   solidifying the polymer precursor so as to form the optical component made by a polymer.

2. The method according to claim 1, wherein the first liquid is a glycerin.

3. The method according to claim 1, wherein the step of providing the polymer precursor at the surface is performed by using one of a manual syringe and an electric dispenser.

4. The method according to claim 1, wherein the second liquid is a silicon oil.

5. The method according to claim 1, wherein the polymer precursor has a density smaller than that of the first liquid, but greater than that of the second liquid.

6. The method according to claim 1, wherein the polymer is one of a thermosetting polymer and a thermoplastic polymer.

7. The method according to claim 6, wherein when the polymer is the thermosetting polymer, the step of solidifying the polymer precursor comprises at least one selected from a group consisting of photocuring, thermocuring or dual-part curing.

8. The method according to claim 1, wherein the frame set performs at least one of positioning the polymer precursor and adjusting a shape of the polymer precursor.

9. The method according to claim 1, wherein the optical component has a surface roughness smaller than 10 nm.

10. A method of manufacturing an optical component, comprising steps of:
providing a liquid;
providing a frame set into the liquid, wherein the frame set includes a first frame and a second frame;
providing a polymer precursor into the liquid and between the first frame and the second frame, wherein the polymer precursor, the first frame and the second frame are completely submerged in the liquid; and
solidifying the polymer precursor so as to form the optical component made by a polymer.

11. The method according to claim 10, wherein the liquid is a glycerin.

12. The method according to claim 10, wherein the step of providing the polymer precursor into the liquid is performed by using one of a manual syringe and an electric dispenser.

13. The method according to claim 10, wherein the polymer is one of a thermosetting polymer and a thermoplastic polymer.

14. The method according to claim 13, wherein when the polymer is the thermosetting polymer, the step of solidifying the polymer precursor comprises at least one selected from a group consisting of photocuring, thermocuring and dual-part curing.

15. The method according to claim 10, wherein the polymer precursor has a density close to that of the liquid.

16. The method according to claim 10, wherein the frame set performs at least one of positioning the polymer precursor and adjusting a shape of the polymer precursor.

17. The method according to claim 10, wherein the optical component has a surface roughness smaller than 10 nm or has a diameter ranged from 200 μm to 600 μm.

* * * * *